United States Patent
Alexandrovichserov et al.

(10) Patent No.: US 8,053,143 B2
(45) Date of Patent: Nov. 8, 2011

(54) SUPPORTED RUTHENIUM CATHODE CATALYST FOR FUEL CELL

(75) Inventors: Alexey Alexandrovichserov, Yongin-si (KR); Chan Kwak, Yongin-si (KR); Si-Hyun Lee, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 1188 days.

(21) Appl. No.: 11/607,336

(22) Filed: Nov. 30, 2006

(65) Prior Publication Data

US 2007/0122685 A1   May 31, 2007

(30) Foreign Application Priority Data

Nov. 30, 2005   (KR) .................. 10-2005-0115919

(51) Int. Cl.
*H01M 4/90* (2006.01)
*B01J 23/40* (2006.01)

(52) U.S. Cl. ........ 429/526; 429/532; 429/492; 429/528; 502/327

(58) Field of Classification Search ................ 429/44
See application file for complete search history.

(56) References Cited

U.S. PATENT DOCUMENTS

| | | | |
|---|---|---|---|
| 2004/0096728 A1* | 5/2004 | Campbell | 429/40 |
| 2005/0031926 A1 | 2/2005 | Sugimasa et al. | |
| 2005/0037920 A1* | 2/2005 | Devenney et al. | 502/313 |

FOREIGN PATENT DOCUMENTS

| | | |
|---|---|---|
| CN | 01118132 | 6/2003 |
| EP | 1 414 089 A1 | 4/2004 |
| JP | 10-92441 | 4/1998 |
| JP | 2001-502467 | 2/2001 |
| JP | 2004-146223 | 5/2004 |
| JP | 2005-087989 | 4/2005 |
| JP | 2006-252797 | 9/2006 |
| JP | 2007-042646 | 2/2007 |
| JP | 2007-134337 | 5/2007 |
| KR | 10-2004-0013284 | 2/2004 |
| WO | WO 2005/008813 A1 | 1/2005 |
| WO | WO 2006/137302 A1 | 12/2006 |

OTHER PUBLICATIONS

Patent Abstracts of Japan, Publication No. 10-092441, dated Apr. 10, 1998, in the name of Masaru Yoshitake et al.
Patent Abstracts of Japan, Publication No. 2004-146223, dated May 20, 2004, in the name of Atsushi Ueda et al.

(Continued)

*Primary Examiner* — Keith Walker
(74) *Attorney, Agent, or Firm* — Christie, Parker & Hale, LLP (57) ABSTRACT

A cathode catalyst for a fuel cell including a metal selected from the group consisting of In, Ga, and combinations thereof, and Ru—Ch supported on the metal, where Ch includes a material selected from the group consisting of S, Se, Te, and combinations thereof. In one embodiment, the Ru—Ch includes from about 70 to about 95 atom % of Ru, and from about 5 to about 30 atom % of Ch, and/or the Ru—Ch is supported in an amount from about 5 to about 80 wt % based on the Ru—Ch and the metal.

20 Claims, 2 Drawing Sheets

OTHER PUBLICATIONS

Korean Patent Abstracts, Publication No. 1020040013284 A, dated Feb. 14, 2004, in the name of Gwang Sun Ahn et al.

European Search Report dated Feb. 28, 2007, for EP 06124983.5, in the name of Samsung SDI Co., Ltd.

Malakhov, I.V., et al., In situ *EXAFS study of Ru-containg electrocatalysts of oxygen reduction*, Nuclear Instruments and Methods in Physics Research A 448, (2000), pp. 323-326, XP-002418132.

Salvador, P, et al., *Photoelectrocatalytic Study of Water Oxidation at n-RuS$_2$ Electrodes*, J. Electrochem. Soc., vol. 145, No. 1, Jan. 1998, pp. 216-225, XP-002418133.

Lamy, C. et al., *Recent advances in the development of direct alcohol fuel cells (DAFC)*, Journal of Power Sources, vol. 105, No. 2, Mar. 20, 2002, XP-004344353.

* cited by examiner

SUPPORTED RUTHENIUM CATHODE CATALYST FOR FUEL CELL

CROSS-REFERENCE TO RELATED APPLICATION

This application claims priority to and the benefit of Korean Patent Application No. 10-2005-0115919, filed in the Korean Intellectual Property Office on Nov. 30, 2005, the entire content of which is incorporated herein by reference.

FIELD OF THE INVENTION

The present invention relates to a cathode catalyst for a fuel cell, a membrane-electrode assembly for a fuel cell, and a fuel cell system including the same.

BACKGROUND OF THE INVENTION

A fuel cell is a power generation system for producing electrical energy through an electrochemical redox reaction of an oxidant and hydrogen in a hydrocarbon-based material such as methanol, ethanol, or natural gas.

Representative exemplary fuel cells include a polymer electrolyte membrane fuel cell (PEMFC) and a direct oxidation fuel cell (DOFC). The direct oxidation fuel cell includes a direct methanol fuel cell, which uses methanol as a fuel.

The polymer electrolyte fuel cell has a high energy density, but requires a fuel reforming processor for reforming methane or methanol, natural gas, and the like in order to produce hydrogen as the fuel gas.

By contrast, the direct oxidation fuel cell has a lower energy density than that of the polymer electrolyte fuel cell, but does not need an additional fuel reforming processor.

In an above-mentioned fuel cell, a stack that generates electricity substantially includes several cell units (or unit cells) stacked in multiple layers, and each cell unit (or unit cell) is formed by a membrane-electrode assembly (MEA) and a separator (also referred to as a bipolar plate). The membrane-electrode assembly has an anode (also referred to as a fuel electrode or an oxidation electrode) and a cathode (also referred to as an air electrode or a reduction electrode) that are separated by an electrolyte membrane therebetween.

SUMMARY OF THE INVENTION

Aspects of the present invention relate to a cathode catalyst having a relatively high activity for reduction of an oxidant and a relatively high selectivity, and being capable of improving performance of a membrane-electrode assembly for a fuel cell, and a membrane-electrode assembly and a fuel cell system including the same. That is, an aspect of the present invention provides a cathode catalyst for a fuel cell having a relatively high activity and selectivity for reduction of an oxidant. Another aspect of the present invention provides a membrane-electrode assembly for a fuel cell including the cathode catalyst. A further aspect of the present invention provides a fuel cell system including the membrane-electrode assembly for a fuel cell.

According to one embodiment of the present invention, a cathode catalyst for a fuel cell includes a metal selected from the group consisting of In, Ga, and combinations thereof, and Ru—Ch supported on the metal, wherein Ch includes a material selected from the group consisting of S, Se, Te, and combinations thereof.

According to another embodiment of the present invention, a membrane-electrode assembly for a fuel cell includes a polymer electrolyte membrane with an anode and a cathode on opposite sides of the polymer electrolyte membrane, wherein the anode includes a conductive electrode substrate and a catalyst layer disposed on the electrode substrate, and the cathode includes a conductive electrode substrate and a catalyst layer disposed on the electrode substrate, the catalyst layer including a metal selected from the group consisting of In, Ga, and combinations thereof, and Ru—Ch supported on the metal, where Ch is a material selected from the group consisting of S, Se, Te, and combinations thereof.

According to a further embodiment of the present invention, a fuel cell system includes an electricity generating element, a fuel supplier adapted to supply the electricity generating element with a fuel, and an oxidant supplier adapted to supply the electricity generating element with an oxidant, wherein the electricity generating element includes a membrane-electrode assembly, and a separator disposed at either side of the membrane-electrode assembly, the membrane-electrode assembly including a polymer electrolyte membrane with an anode and a cathode on opposite sides of the polymer electrolyte membrane, wherein the anode includes a conductive electrode substrate and a catalyst layer disposed on the electrode substrate, and the cathode includes a conductive electrode substrate and a catalyst layer disposed on the electrode substrate, wherein the catalyst layer of the cathode includes a metal selected from the group consisting of In, Ga, and combinations thereof, and Ru—Ch supported on the metal, where Ch is a material selected from the group consisting of S, Se, Te, and combinations thereof.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

A fuel cell is a power generation system for generating electrical energy through oxidation of a fuel and reduction of an oxidant. The oxidation of a fuel occurs at an anode, while the reduction of an oxidant occurs at a cathode.

The anode includes an anode catalyst layer for oxidizing a fuel, and the cathode includes a cathode catalyst layer for reducing an oxidant. The catalyst for the anode catalyst layer may include platinum-ruthenium, while the catalyst for the cathode catalyst layer may include platinum.

However, using platinum as a cathode catalyst has a problem in that platinum provides a relatively low activity for a reduction reaction of an oxidant. Platinum can also be depolarized by a fuel that crosses over toward a cathode through an electrolyte membrane, thereby becoming non-activated in a direct oxidation fuel cell. Therefore, there is a need for another catalyst that can be substituted for platinum.

A cathode catalyst according to one embodiment of the present invention includes a metal selected from the group consisting of In, Ga, and combinations thereof, and Ru—Ch supported on the metal. The Ch is (or includes) a chalcogen material selected from the group consisting of S, Se, Te, and combinations thereof.

Ruthenium (Ru) (or rhodium (Rh)) is a platinum-grouped element (or a transition metal) and has a relatively high activity for a reduction reaction of an oxidant. However, oxygen in the air is easily adsorbed by Ru (or Rh) and can thereby block the active center of Ru (or Rh), resulting in deterioration of reduction of an oxidant.

Accordingly, pursuant to aspects of the present invention, S, Se, or Te is bound to Ru to block (or prevent) oxygen in the air from being bound with Ru, thereby promoting oxidation of a fuel and suppressing reduction of an oxidant.

As a result, Ru—Ch has a relatively high activity for a reduction reaction of an oxidant as well a relatively high selectivity, and thereby cathode performance can be maintained even when a fuel crosses over to the cathode.

In the Ru—Ch, Ru is included in an amount ranging from 70 to 95 atom % and, in one embodiment, ranging from 80 to 85 atom %, and Ch is included in an amount ranging from 5 to 30 atom % and, in one embodiment, ranging from 15 to 20 atom %. When the amount of Ch is less than 5 atom %, selectivity for a reduction reaction of an oxidant decreases Whereas, when the amount of Ch is more than 30 atom %, the number of active centers decreases and therefore, activity for a reduction reaction of an oxidant significantly decreases.

The Ru—Ch itself has a relatively low electric conductivity, and the Ru—Ch particles may be aggregated with each other, resulting in a relatively large-sized particles. As such, the Ru—Ch has a relatively small surface area per unit mass, which is a specific surface area that results in low catalytic activity. To overcome the above described problems, the Ru—Ch may be supported on a carbon-based material.

In one embodiment of the present invention, a metal selected from the group consisting of In, Ga, and combinations thereof is used as a carrier instead of carbon. When the metal selected from the group consisting of In, Ga, and combinations thereof is used as the carrier for Ru—Ch, the metal has a strong interaction with Ru—Ch, resulting in a highly stable catalyst. Here, the metal, such as In or Ga, is an electron donor for the Ru—Ch, and shares an electron orbit with the Ru to cause a relatively high energetic interaction between electrons, resulting in an increase of catalyst activity. That is, In and/or Ga can form an active phase by uniting with Ru—Ch, and can also support Ru—Ch as a carrier.

The smaller the In and/or Ga particles are, the better they are. When small particles of In and/or Ga are used as to support Ru—Ch as a carrier have, they can have a high specific surface area and thereby increase the amount of Ru—Ch supported on the carrier.

In one embodiment, as a carrier, the In and/or Ga can be formed into nanotubes, nanowires, and/or nanospheres, and their specific surface area can be formed to have a range from 100 to 250 $m^2/g$. Also, when In and/or Ga particles are used as a carrier, Ru—Ch particles can have a diameter ranging from 3 to 4 nm.

The nanotubes, nanowires, and/or nanospheres can be formed by reacting an oxide of In and/or Ga with ethyleneglycol at high temperature and high pressure.

The amount of Ru—Ch supported on the In and/or Ga can be in a range from 5 to 80 wt % based on the total weight of Ru—Ch and its support material (e.g., the In and/or Ga or the metal). When the Ru—Ch is supported at less than 5 wt %, the amount of catalyst activity material is so low to result in a relatively low catalytic activity. Whereas, when the Ru—Ch is support at more than 80 wt %, there is not enough In and/or Ga particles to provide a large surface area. In another embodiment, the amount of Ru—Ch supported on the In and/or Ga can be in a range from 20 to 60 wt % based on the total weight of Ru—Ch and its support material (e.g., the In and/or Ga or the metal).

In one embodiment of the present invention, when Ru—Ch is supported on In and/or Ga, ruthenium salt and chalcogen element powders are dissolved in a solvent, and thereafter, In and/or Ga powders are added thereto. Then, the resulting mixture is appropriately mixed, dried, and heat-treated. Suitable ruthenium salts include ruthenium chloride, ruthenium acetylacetonate, ruthenium carbonyl, etc. Examples of the solvent include water, acetone, and/or benzene; and the heat treatment is performed at a temperature ranging from 150 to 200° C.

One embodiment of the present invention also provides a membrane-electrode assembly for a fuel cell that includes a cathode catalyst according to an embodiment of the present invention.

The membrane-electrode assembly of the present invention includes a polymer electrolyte membrane with an anode and a cathode on opposite sides of the polymer electrolyte membrane. The anode includes an electrode substrate and a catalyst layer disposed on the electrode substrate, and the cathode also includes an electrode substrate and a catalyst layer disposed on the electrode substrate.

Figure 1:
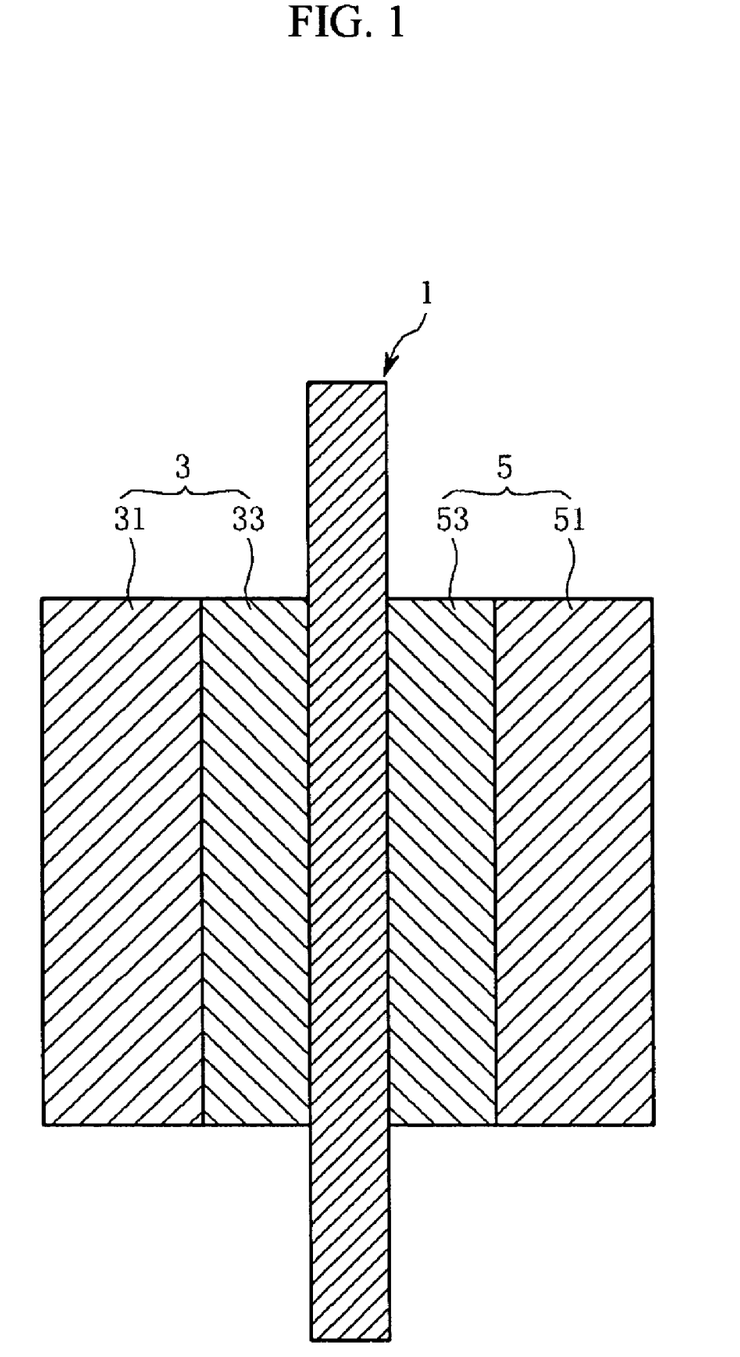
FIG. 1 is a schematic cross-sectional view showing a membrane-electrode assembly according to an embodiment of the present invention.

FIG. 1 is a schematic cross-sectional view of a membrane-electrode assembly 131 according to an embodiment of the present invention. Hereinafter, the membrane-electrode assembly 131 of the present invention is described in more detail with reference to FIG. 1.

The membrane-electrode assembly 131 generates electrical energy through oxidation of a fuel and reduction of an oxidant. One or several membrane-electrode assemblies are stacked adjacent to one another to form a stack.

An oxidant is reduced at a catalyst layer 53 of a cathode 5 of the membrane-electrode assembly 131, which includes a cathode catalyst that includes a metal selected from the group consisting of In, Ga, and combinations thereof, and Ru—Ch supported on the metal. The Ch is (or includes) a material selected from the group consisting of S, Se, Te, and combinations thereof. Here, the cathode catalyst has a relatively high selectivity as well as a relatively high activity for reduction of an oxidant, and can thereby improve performance of the cathode 5 and the membrane-electrode assembly 131 including the same.

A fuel is oxidized at a catalyst layer 33 of an anode 3 the membrane-electrode assembly 131, which includes a catalyst that is capable of accelerating the oxidation of a fuel. The catalyst may be platinum-based (i.e., may be any suitable platinum-based catalyst). The platinum-based catalyst includes platinum, ruthenium, osmium, a platinum-ruthenium alloy, a platinum-osmium alloy, a platinum-palladium alloy, a platinum-M alloy, or combinations thereof, where M includes a transition element (or metal) selected from the group consisting of Ga, Ti, V, Cr, Mn, Fe, Co, Ni, Cu, Zn, Sn, Mo, W, Rh, and combinations thereof. Representative examples of the catalysts include a catalyst selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst may be used in a form of a metal itself (black catalyst or without a carrier) or can be used while being supported on a carrier. The carrier may include carbon such as acetylene black, denka black, activated carbon, ketjen black, and/or graphite, and/or an inorganic particulate such as alumina, silica, zirconia, and/or titania. In one embodiment, carbon is used.

The catalyst layers 33 and 53 may further include a binder resin. The binder resin may be any suitable material that is used in an electrode for a fuel cell. Non-limiting examples of the binder resin include polytetrafluoroethylene, polyvinylidene fluoride, polyvinylidene chloride, polyvinyl alcohol, cellulose acetate, poly(perfluorosulfonic acid), etc.

The electrode substrates 31 and 51 of the anode 3 and the cathode 5 provide a path for transferring reactants such as fuel and an oxidant to the catalyst layers 33 and 53. In one embodiment, the electrode substrates 31 and 51 are formed from a material such as carbon paper, carbon cloth, carbon felt, or a metal cloth (a porous film composed of metal fiber or a metal film disposed on a surface of a cloth composed of polymer fibers). However, the electrode substrate of the present invention is not limited thereto.

The polymer electrolyte membrane 1 exchanges ions by transferring the protons produced from an anode catalyst 33 to a cathode catalyst 53.

Proton conductive polymers for the polymer electrolyte membrane of the present invention may be any polymer resin having a cation exchange group at its side chain selected from the group consisting of a sulfonic acid group, a carboxylic acid group, a phosphoric acid group, a phosphonic acid group, and derivatives thereof.

Non-limiting examples of the polymer resin include a proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment of the present invention, the proton conductive polymer includes a polymer selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5, 5'-bibenzimidazole), or poly (2,5-benzimidazole). In one embodiment, the polymer electrolyte membrane has a thickness ranging from 10 to 200 μm.

According to an embodiment of the present invention, a fuel cell system including the above membrane-electrode assembly is provided. The fuel cell system includes one or more electricity generating elements, a fuel supplier, and an oxidant supplier.

The electricity generating element includes a membrane-electrode assembly, and separators (bipolar plates) positioned at both sides of the membrane-electrode assembly. The electricity generating element generates electricity through oxidation of a fuel and reduction of an oxidant.

The fuel supplier supplies the electricity generating element with a fuel including hydrogen, and the oxidant supplier supplies the electricity generating element with an oxidant. The fuel includes liquid or gaseous hydrogen, or a hydrocarbon-based fuel such as methanol, ethanol, propanol, butanol, or natural gas. The oxidant generally includes oxygen or air. The fuel and oxidant of the present invention are not limited thereto.

The fuel cell system may be applied to a polymer electrolyte fuel cell (PEMFC), and/or a direct oxidation fuel cell (DOFC). According to one embodiment of the present invention, since a cathode catalyst has a relatively high selectivity for reduction of oxygen, it can be more effectively used for a direct oxidation fuel cell having a fuel crossover problem and most effectively for a direct methanol fuel cell (DMFC).

Figure 2:
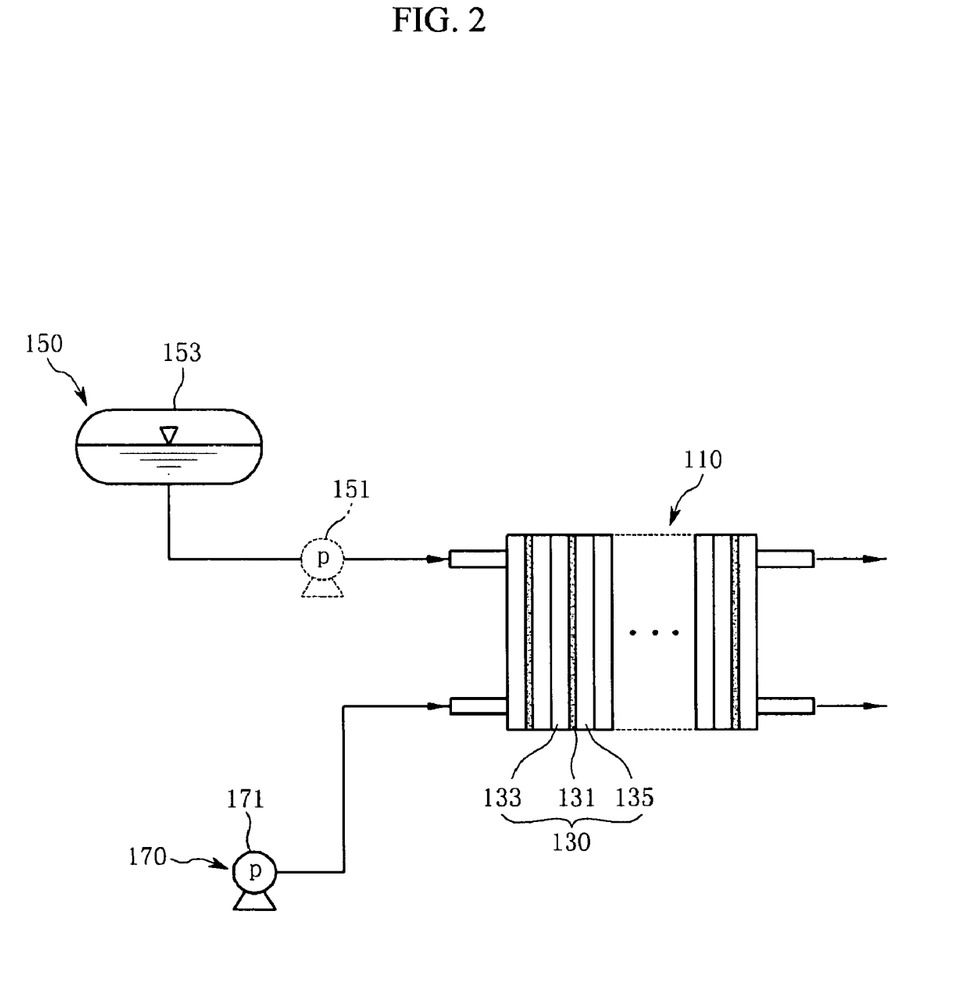
FIG. 2 is a schematic diagram showing a structure of a fuel cell system according to another embodiment of the present invention.

FIG. 2 shows a schematic structure of a fuel cell system 100 that will be described in more detail with reference to FIG. 2, as follows. FIG. 2 illustrates a fuel cell system wherein a fuel and an oxidant are provided to the electricity generating element 130 through pumps 151 and 171, but the present invention is not limited to such structures. The fuel cell system of the present invention alternatively may include a structure wherein a fuel and an oxidant are provided by diffusion.

A fuel cell system 100 includes a stack 110 composed of one or more electricity generating elements 130 for generating electrical energy through an electrochemical reaction of a fuel and an oxidant. In addition, the fuel cell system includes a fuel supplier 150 for supplying the fuel to the one or more electricity generating elements 130, and an oxidant supplier 170 for supplying the oxidant to the one or more electricity generating elements 130.

In addition, the fuel supplier 150 is equipped with a tank 153 that stores fuel, and a pump 151 that is connected therewith. The fuel pump 151 supplies fuel stored in the tank 153 to the stack 110.

The oxidant supplier 170, which supplies the one or more electricity generating elements 130 of the stack 110 with the oxidant, is equipped with at least one pump 171 for supplying the oxidant to the stack 110.

The electricity generating element 130 includes a membrane-electrode assembly 131 that oxidizes hydrogen (or a fuel) and reduces an oxidant, and separators 133 and 135 that are respectively positioned at opposite sides of the membrane-electrode assembly 131 and supply hydrogen (or the fuel) and the oxidant, respectively.

The following examples illustrate the present invention in more detail. However, the present invention is not limited by these examples.

Example 1

0.466 g of $In_2O_3$ was mixed with 30 ml of ethylene glycol at room temperature, and thereafter, agitated for 30 minutes. The prepared solution was put in a high pressure reactor, and thereafter, ethylene glycol was added up to 80% of the reactor. The resulting mixture was reacted at 200° C. for 2 hours, cooled down to room temperature, washed with thin hydrochloric acid, methanol, and distilled water in order, then filtered and dried at 60° C. for 4 hours, thereby forming In nanotube powders.

Then, 1 g of ruthenium chloride and 0.1 g of Se powder were dissolved in 100 ml of a benzene solvent, and 1 g of the indium (In) nanotube powders were added thereto.

The resulting mixture was dried at 80° C., and heat-treated at 170° C. for 4 hours to prepare a cathode catalyst for a fuel cell.

Comparative Example 1

0.6 g of ruthenium carbonyl was dissolved in 150 ml of benzene. The prepared solution was mixed with 0.01 g of selenium powder and 1 g of carbon nanotube, and thereafter, agitated for 24 hours while refluxing them at 120° C. Then, the resultant was washed and then dried at 80° C. for 12 hours.

The prepared powders were heat-treated at 250° C. for 3 hours under a hydrogen atmosphere to prepare a cathode for a fuel cell.

Next, an oxygen gas was bubbled into a sulfuric acid solution in 0.5 M concentration to prepare an oxygen-saturated sulfuric acid solution. The catalyst of Example 1 (Ru—Se supported on an In nanotube) and the catalyst of Comparative Example 1 (Ru—Se supported on a carbon nanotube) were respectively loaded on a glassy carbon with $3.78 \times 10^{-3}$ mg to prepare an operating electrode. Then, a platinum mesh was prepared as a counter electrode. These electrodes were then put in the sulfuric acid solution, and current densities for Example 1 and Comparative Example 1 were then determined at 0.7V. The results are provided in the following Table 1.

TABLE 1

| | Current density ($mA/cm^2$) at 0.7 V |
|---|---|
| Example 1 | 1.27 |
| Comparative Example 1 | 0.51 |

As shown in Table 1, a catalyst of Example 1 has a higher catalyst activity than that of Comparative Example 1.

In view of the foregoing, a cathode catalyst according to an embodiment of the present invention has a relatively high activity for reduction of an oxidant and a relatively high selectivity, and is capable of improving performance of a membrane-electrode assembly for a fuel cell, and a fuel cell system.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A cathode catalyst for a fuel cell, the cathode catalyst comprising:
    metal particles selected from the group consisting of In, Ga, and combinations thereof, and
    Ru—Ch supported on and surrounding each of the metal particles,
    wherein Ch includes a material selected from the group consisting of S, Se, Te, and combinations thereof.

2. The cathode catalyst of claim 1, wherein each of the metal particles has a structure selected from the group consisting of nanotube, nanowire, and nanosphere.

3. The cathode catalyst of claim 1, wherein the Ru—Ch comprises from about 70 to about 95 atom % of Ru, and from about 5 to about 30 atom % of Ch.

4. The cathode catalyst of claim 3, wherein the Ru—Ch comprises from about 80 to about 85 atom % of Ru, and from about 15 to about 20 atom % of Ch.

5. The cathode catalyst of claim 1, wherein the Ru—Ch is supported in an amount from about 5 to about 80 wt % based on the total weight of Ru—Ch and the metal.

6. The cathode catalyst of claim 5, wherein the Ru—Ch is supported in the amount from about 20 to about 60 wt % based on the total weight of Ru—Ch and each of the metal particles.

7. The cathode catalyst of claim 1, wherein the Ch is Se.

8. The cathode catalyst of claim 1, wherein each of the metal particles has a diameter in a range of about 3 to about 4 nm.

9. A membrane-electrode assembly for a fuel cell, the membrane-electrode assembly comprising a polymer electrolyte membrane with an anode and a cathode on opposite sides of the polymer electrolyte membrane, wherein the anode comprises a conductive electrode substrate and a catalyst layer disposed on the electrode substrate, and the cathode comprises a conductive electrode substrate and a catalyst layer disposed on the electrode substrate, the catalyst layer of the cathode comprising metal particles selected from the group consisting of In, Ga, and combinations thereof, and Ru—Ch supported on and surrounding each of the metal particles, where Ch is a material selected from the group consisting of S, Se, Te, and combinations thereof.

10. The cathode catalyst of claim 9, wherein the polymer electrolyte membrane comprises a polymer resin having a cation exchange group at its side chain selected from the group consisting of a sulfonic acid group, a carboxylic acid group, a phosphoric acid group, a phosphonic acid group, and derivatives thereof.

11. The membrane-electrode assembly of claim 10, wherein the polymer resin comprises a proton conductive polymer selected from the group consisting of fluoro-based polymers, benzimidazole-based polymers, polyimide-based polymers, polyetherimide-based polymers, polyphenylene-sulfide-based polymers, polysulfone-based polymers, polyethersulfone-based polymers, polyetherketone-based polymers, polyether-etherketone-based polymers, polyphenylquinoxaline-based polymers, and combinations thereof.

12. The membrane-electrode assembly of claim 11, wherein the polymer resin comprises a material selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), poly (2,5-benzimidazole), and combinations thereof.

13. The membrane-electrode assembly of claim 9, wherein the catalyst layer of the anode comprises a material selected from the group consisting of platinum, ruthenium, osmium, a platinum-ruthenium alloy, a platinum-osmium alloy, a platinum-palladium alloy, a platinum-M alloy, and combinations thereof, and wherein M comprises a transition metal selected from the group consisting of Ga, Ti, V, Cr, Mn, Fe, Co, Ni, Cu, Zn, Sn, Mo, W, Rh, and combinations thereof.

14. The membrane-electrode assembly of claim 13, wherein the catalyst in the anode is supported on a carrier, and wherein the carrier of the anode includes a material selected from the group consisting of acetylene black, denka black, activated carbon, ketjen black, graphite, alumina, silica, titania, zirconia, and combinations thereof.

15. The membrane-electrode assembly of claim 9, wherein at least one of the catalyst layer of the anode or the catalyst layer of the cathode further comprises a binder resin selected from the group consisting of polytetrafluoroethylene, polyvinylidene fluoride, polyvinylidene chloride, polyvinyl alcohol, cellulose acetate, poly(perfluorosulfonic acid), and combinations thereof.

16. The membrane-electrode assembly of claim 9, wherein at least one of the electrode substrate of the anode or the electrode substrate of the cathode comprises a material selected from the group consisting of carbon paper, carbon cloth, carbon felt, a metal cloth, and combinations thereof.

17. A fuel cell system comprising an electricity generating element, a fuel supplier adapted to supply the electricity generating element with a fuel, and an oxidant supplier adapted to supply the electricity generating element with an oxidant, wherein the electricity generating element comprises a membrane-electrode assembly, and a separator disposed at either side of the membrane-electrode assembly, the membrane-electrode assembly comprising a polymer electrolyte membrane with an anode and a cathode on opposite sides of the polymer electrolyte membrane, wherein the anode comprises a conductive electrode substrate and a catalyst layer disposed on the electrode substrate, and the cathode comprises a conductive electrode substrate and a catalyst layer disposed on the electrode substrate, wherein the catalyst layer of the cathode comprises metal particles selected from the group consisting of In, Ga, and combinations thereof, and Ru—Ch supported on and surrounding each of the metal particles, where Ch is a material selected from the group consisting of S, Se, Te, and combinations thereof.

18. The fuel cell system of claim 17, wherein the fuel cell system is for a polymer electrolyte membrane fuel cell.

19. The fuel cell system of claim 17, wherein the fuel cell system is for a direct oxidation fuel cell.

20. The fuel cell system of claim 17, wherein the Ru—Ch comprises from about 70 to about 95 atom % of Ru, and from about 5 to about 30 atom % of Ch, and wherein the Ru—Ch is supported in an amount from about 5 to about 80 wt % based on the total weight of the Ru—Ch and the metal.

\* \* \* \* \*

UNITED STATES PATENT AND TRADEMARK OFFICE
CERTIFICATE OF CORRECTION

Page 1 of 4

PATENT NO. : 8,053,143 B2
APPLICATION NO. : 11/607336
DATED : November 8, 2011
INVENTOR(S) : Alexey Alexandrovichserov et al.

It is certified that error appears in the above-identified patent and that said Letters Patent is hereby corrected as shown below:

Delete title page showing an illustrative figure and substitute the attached title page therefor.

In the Drawings

Sheet 1 of 2, FIG. 1.　　　　　Delete Drawing Sheet 1
　　　　　　　　　　　　　　and substitute therefor the Drawing Sheet,
　　　　　　　　　　　　　　consisting of FIG. 1,
　　　　　　　　　　　　　　as shown on the attached page.

Insert -- 131 --

Sheet 2 of 2, FIG. 2.　　　　　Delete Drawing Sheet 2
　　　　　　　　　　　　　　and substitute therefor the Drawing Sheet,
　　　　　　　　　　　　　　consisting of FIG. 2,
　　　　　　　　　　　　　　as shown on the attached page.

Insert -- 100 --

Signed and Sealed this
Sixth Day of November, 2012

David J. Kappos
*Director of the United States Patent and Trademark Office*

(12) United States Patent
Alexandrovichserov et al.

(10) Patent No.: US 8,053,143 B2
(45) Date of Patent: Nov. 8, 2011

(54) SUPPORTED RUTHENIUM CATHODE CATALYST FOR FUEL CELL

(75) Inventors: Alexey Alexandrovichserov, Yongin-si (KR); Chan Kwak, Yongin-si (KR); Si-Hyun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1188 days.

(21) Appl. No.: 11/607,336

(22) Filed: Nov. 30, 2006

(65) Prior Publication Data

US 2007/0122685 A1    May 31, 2007

(30) Foreign Application Priority Data

Nov. 30, 2005    (KR) .................. 10-2005-0115919

(51) Int. Cl.
*H01M 4/90* (2006.01)
*B01J 23/40* (2006.01)

(52) U.S. Cl. ........ 429/526; 429/532; 429/492; 429/528; 502/327

(58) Field of Classification Search .............. 429/44
See application file for complete search history.

(56) References Cited

U.S. PATENT DOCUMENTS

| | | | |
|---|---|---|---|
| 2004/0096728 A1* | 5/2004 | Campbell | 429/40 |
| 2005/0031926 A1 | 2/2005 | Sugimasa et al. | |
| 2005/0037920 A1* | 2/2005 | Devenney et al. | 502/313 |

FOREIGN PATENT DOCUMENTS

| | | |
|---|---|---|
| CN | 01118132 | 6/2003 |
| EP | 1 414 089 A1 | 4/2004 |
| JP | 10-92441 | 4/1998 |
| JP | 2001-502467 | 2/2001 |
| JP | 2004-146223 | 5/2004 |
| JP | 2005-087989 | 4/2005 |
| JP | 2006-252797 | 9/2006 |
| JP | 2007-042646 | 2/2007 |
| JP | 2007-134337 | 5/2007 |
| KR | 10-2004-0013284 | 2/2004 |
| WO | WO 2005/008813 A1 | 1/2005 |
| WO | WO 2006/137302 A1 | 12/2006 |

OTHER PUBLICATIONS

Patent Abstracts of Japan, Publication No. 10-092441, dated Apr. 10, 1998, in the name of Masaru Yoshitake et al.
Patent Abstracts of Japan, Publication No. 2004-146223, dated May 20, 2004, in the name of Atsushi Ueda et al.

(Continued)

*Primary Examiner* — Keith Walker
(74) *Attorney, Agent, or Firm* — Christie, Parker & Hale, LLP (57) ABSTRACT

A cathode catalyst for a fuel cell including a metal selected from the group consisting of In, Ga, and combinations thereof, and Ru—Ch supported on the metal, where Ch includes a material selected from the group consisting of S, Se, Te, and combinations thereof. In one embodiment, the Ru—Ch includes from about 70 to about 95 atom % of Ru, and from about 5 to about 30 atom % of Ch, and/or the Ru—Ch is supported in an amount from about 5 to about 80 wt % based on the Ru—Ch and the metal.

20 Claims, 2 Drawing Sheets

FIG. 1

FIG. 2